United States Patent
Waddington et al.

(10) Patent No.: US 8,332,409 B2
(45) Date of Patent: Dec. 11, 2012

(54) SELECTION OF ASSOCIATED CONTENT FOR CONTENT ITEMS

(75) Inventors: Simon Waddington, Basingstoke (GB); Ben M. Bratu, Versailles (RO); Ioannis Kompatsiaris, Thermi Thessaloniki (GR); Fotis Menemenis, Thermi-Thessaloniki (GR); Symeon Papadopoulos, Thermi-Thessaloniki (GR)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/060,288

(22) PCT Filed: Aug. 24, 2009

(86) PCT No.: PCT/US2009/054722
§ 371 (c)(1),
(2), (4) Date: Apr. 11, 2011

(87) PCT Pub. No.: WO2010/033346
PCT Pub. Date: Mar. 25, 2010

(65) Prior Publication Data
US 2011/0179084 A1    Jul. 21, 2011

(30) Foreign Application Priority Data
Sep. 19, 2008 (GB) .................................. 0817170.4

(51) Int. Cl.
*G06F 17/30* (2006.01)
(52) U.S. Cl. ........ 707/737; 707/749; 707/750; 707/794; 707/798; 704/9
(58) Field of Classification Search .......... 707/736–798; 704/9
See application file for complete search history.

(56) References Cited

U.S. PATENT DOCUMENTS

| | | | | |
|---|---|---|---|---|
| 5,940,821 A * | 8/1999 | Wical | ................................... | 1/1 |
| 5,953,718 A * | 9/1999 | Wical | ................................... | 1/1 |
| 6,038,560 A * | 3/2000 | Wical | ................................... | 1/1 |
| 6,311,194 B1 | 10/2001 | Sheth et al. | | |
| 6,460,034 B1 * | 10/2002 | Wical | ................................... | 1/1 |
| 6,523,026 B1 * | 2/2003 | Gillis | ................................... | 1/1 |
| 6,678,694 B1 * | 1/2004 | Zimmermann et al. | ...... | 707/731 |

(Continued)

FOREIGN PATENT DOCUMENTS
WO    2005020094 A1    3/2005

OTHER PUBLICATIONS

Trajkova, et al., "Improving Ontology-Based User Profiles," Proceedings of RIAO 2004, Avignon, France, Apr. 26-28, 2004, pp. 380-389.

(Continued)

*Primary Examiner* — Hanh Thai
(74) *Attorney, Agent, or Firm* — Stephen H. Shaw

(57) ABSTRACT

A content device may select associated content, such as adverts, for a user selected content item based on textual characterizing data for the associated content and the user selected content item. A term set characterizing the user selected content item is expanded using semantic graphs and similarity values between the expanded term set and term sets describing associated content is calculated. A specific associated content item is then selected based on the similarity values. The semantic graph based term set expansion may allow improved accuracy in selecting appropriate associated content while providing a process that is suitable for resource constrained scenarios. In particular, communication resource, memory resource, and computational resource usage may be kept low.

10 Claims, 6 Drawing Sheets

U.S. PATENT DOCUMENTS

| | | | |
|---|---|---|---|
| 6,895,406 B2 | 5/2005 | Fables et al. | |
| 7,454,430 B1 | 11/2008 | Komissarchik et al. | |
| 2002/0107827 A1 | 8/2002 | Benitez-Jimenez et al. | |
| 2002/0111941 A1* | 8/2002 | Roux et al. | 707/3 |
| 2002/0150093 A1 | 10/2002 | Ott et al. | |
| 2003/0217335 A1* | 11/2003 | Chung et al. | 715/514 |
| 2004/0064833 A1 | 4/2004 | Lee et al. | |
| 2004/0243529 A1 | 12/2004 | Stoneman | |
| 2005/0080775 A1 | 4/2005 | Colledge et al. | |
| 2005/0080776 A1 | 4/2005 | Colledge et al. | |
| 2005/0108200 A1* | 5/2005 | Meik et al. | 707/3 |
| 2005/0187954 A1 | 8/2005 | Raman et al. | |
| 2006/0010439 A1* | 1/2006 | Majidian | 718/1 |
| 2006/0047632 A1* | 3/2006 | Zhang | 707/3 |
| 2006/0074980 A1 | 4/2006 | Sarkar | |
| 2006/0074991 A1* | 4/2006 | Lussier et al. | 707/200 |
| 2006/0271353 A1* | 11/2006 | Berkan et al. | 704/9 |
| 2007/0011155 A1 | 1/2007 | Sarkar et al. | |
| 2007/0112714 A1 | 5/2007 | Fairweather | |
| 2007/0156622 A1* | 7/2007 | Akkiraju et al. | 706/48 |
| 2008/0016020 A1 | 1/2008 | Estes | |
| 2008/0020584 A1 | 1/2008 | Ramamurthi et al. | |
| 2008/0027798 A1 | 1/2008 | Ramamurthi et al. | |
| 2008/0183685 A1* | 7/2008 | He et al. | 707/4 |
| 2008/0189268 A1 | 8/2008 | Au | |
| 2008/0243826 A1* | 10/2008 | Bartz et al. | 707/5 |
| 2009/0012842 A1 | 1/2009 | Srinivasan et al. | |
| 2009/0012928 A1* | 1/2009 | Lussier et al. | 706/59 |
| 2009/0037399 A1* | 2/2009 | Bartz et al. | 707/5 |
| 2009/0070299 A1* | 3/2009 | Parikh et al. | 707/3 |
| 2009/0070323 A1* | 3/2009 | Parikh et al. | 707/5 |

OTHER PUBLICATIONS

Cantador, et al., "Enriching Ontological User Profiles with Tagging History for Multi-Domain Recommendations," 1st International Workshop on Collective Semantics: Collective Intelligence and the Semantic Web (CISWeb 2008), Tenerife, Spain, Jun. 2, 2008, 15 pages.

Riberiro-Neto, et al., "Impedance Coupling in Content-Targeted Advertising," Proceedings of the 28th Annual International ACM SIGIR Conference on Research and Development in Information Retrieval, Salvador, Brazil, Aug. 15-19, 2005, pp. 496-503.

* cited by examiner

SELECTION OF ASSOCIATED CONTENT FOR CONTENT ITEMS

FIELD OF THE INVENTION

The invention relates to selection of an associated content item for another content item and in particular, but not exclusively, to selection of adverts suitable for a user selected content item.

BACKGROUND OF THE INVENTION

In recent years, the availability and provision of text documents, multimedia, and entertainment content has increased substantially. For example, the number of available television and radio channels has grown considerably and the popularity of the Internet has provided new content distribution means. Also, the Internet has provided the average user with a seemingly endless source of text documents in the forms of web pages, blogs, online text documents etc.

It has furthermore become of interest to provide additional associated content that relates to the content which is consumed by a user. Such associated content may for example be adverts, such as an advert inserted in a television program or added to a web page. In order to provide associated content which is of particular interest to the individual user, it is desirable that such content is specifically adapted to the individual user's preference profile and to the specific content that the user is currently accessing. In particular, it has been proposed that adverts are specifically adapted to the content being consumed and to the content consumption preferences of the individual user. For example, when a user accesses a web page, it is desirable for any associated adverts to reflect the user's preferences and the characteristics of the specific web page.

Such targeting and personalization of associated content can be achieved by selecting the associated content from a content library such that it matches the selected content. For example, when a user selects a specific content item, such as a webpage or a music clip, on a device, the device may access a local or remote content store to retrieve an associated content item that matches the content item.

Such associated content selection and provision is becoming increasingly important. For example, advertising is a key method of generating revenue from online applications and services. Increasingly content, search, and other web applications, as well as network services and even user devices, are likely to be heavily subsidized by revenue collected from advertising. Targeting of advertisements based on user context and preferences has been demonstrated to increase/improve the user response to adverts.

For example, the business model for web search sites is heavily based on advertising. In this case, search queries are matched to keywords for adverts in an advertisement repository and matching adverts are selected to be presented to the user. An extension of this technique has been applied to insertion of adverts in web pages, where the adverts are selected based on the occurrence of advert keywords in the web page.

However, such selection of adverts has been found to be suboptimal in many scenarios. For example, it has been demonstrated in B. Ribeiro-Neto, M. Cristo, P. B. Golgher, E. Silva de Moura, "Impedance Coupling in Content-targeted Advertising", Proceedings SIGIR '05, Aug. 15-19, 2005, Salvador, Brazil that there tends to be a vocabulary mismatch between web pages and adverts. It has been suggested that selection of adverts can be improved by taking into account supplementary information, such as information of the web pages that have hyperlinks to the advert. Another proposed approach is to first perform a web search based on terms derived from the original web page. Further terms are extracted from the web pages provided by the search and these additional terms are then used when selecting adverts. However, although such an approach may improve the matching of adverts to user content, it tends to be best suited to server-based matching where a large repository of web pages may be cached to assist in the matching process. Indeed, the approach tends to be less suited to resource constrained devices, such as mobile phones or set-top boxes. Indeed, the approach will require substantial computational and storage resources and/or will tend to be slow and impractical. For example, for a mobile phone to repeatedly perform searches using a standard online web search tool will result in a very slow process. Furthermore, the communication and resource requirement for retrieving and processing the search results tend to be excessive for portable devices.

Furthermore, existing approaches tend to result in suboptimal selection of associated content, and it is desirable to provide an improved accuracy of the matching of the associated content to the individual user and consumed content.

Also, in some systems it may be desirable to provide locally stored associated content together with content received from a remote server. For example, a content service provider may wish to offer cheaper (or free) content services in return for the user accepting adverts being presented. These adverts may be locally cached on the user's device with the device autonomously selecting appropriate adverts from those locally cached. Such an approach may provide a number of advantages including for example reducing the loading and requirements for the remote server and allowing the user to have a single profile that can be used with a plurality of different online applications and services. However, it requires the associated content matching to be performed on the user device itself thereby requiring an approach that is suitable for resource constrained devices.

Hence, an improved approach for selecting associated content items would be advantageous and in particular a system allowing increased flexibility, improved content item selection, reduced resource usage, improved suitability for resource constrained devices, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of selecting a content item, the method comprising: providing a plurality of associated term sets, each associated term set of the plurality of associated term sets comprising a set of terms characterizing a content item of a group of content items; providing a set of semantic graphs, each semantic graph of the set of semantic graphs comprising nodes corresponding to terms and edges corresponding to a relationship between terms of nodes connected by the edge; providing a search term set comprising terms characterizing a first content item; expanding the search term set in response to a first semantic graph of the set of semantic graphs to generate an expanded set of terms; determining similarity measures between the expanded set of terms and each of the plurality of associated term sets; and selecting an associated content item for the first content item from the group of content items in response to the similarity measures.

The invention may in many embodiments allow an improved and/or facilitated selection of a content item associated with a first content item. In particular, an improved matching of the associated content item to the first content item may be achieved by the matching considering a larger term set than what is available directly from the first content item. Furthermore, the expansion of the term set may be adapted to the specific content item and/or the user's preferences thereby providing an improved accuracy in the selection of the associated content item.

The invention may be particularly advantageous for selection of associated content items in resource constrained devices or scenarios. Specifically, a reduced resource requirement for term expansion can be achieved using semantic graphs. In particular, communication and storage resource requirements for semantic graphs tend to be low thereby providing an improved suitability for distributing and storing the semantic graph data. The approach may particularly be suitable for systems with a substantial number of low resource devices, such as e.g. mobile phones or other portable devices.

The invention may furthermore in many embodiments allow an improved adaptation to user preferences as the semantic graphs can easily be adapted to the individual user thereby providing a personalized term expansion resulting in an improved personalization of the selected associated content item.

According to another aspect of the invention there is provided a content device content comprising: an associated term processor for providing a plurality of associated term sets, each associated term set of the plurality of associated term sets comprising a set of terms characterizing a content item of a group of content items; a receiver for receiving a set of semantic graphs from a remote server, each semantic graph of the set of semantic graphs comprising nodes corresponding to terms and edges corresponding to a relationship between terms of nodes connected by the edge; a search term processor for providing a search term set comprising terms characterizing a first content item; an expansion processor for expanding the search term set in response to a first semantic graph of the set of semantic graphs to generate an expanded set of terms; a similarity processor for determining similarity measures between the expanded set of terms and each of the plurality of associated term sets; and a selection processor for selecting a content item from the group of content items in response to the similarity measures.

According to another aspect of the invention there is provided a communication system comprising a content device as defined above.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to selection of adverts for content items, such as text documents, web pages, and music clips. However, it will be appreciated that the invention is not limited to this application but may be applied to many other types of content items.

Figure 1:
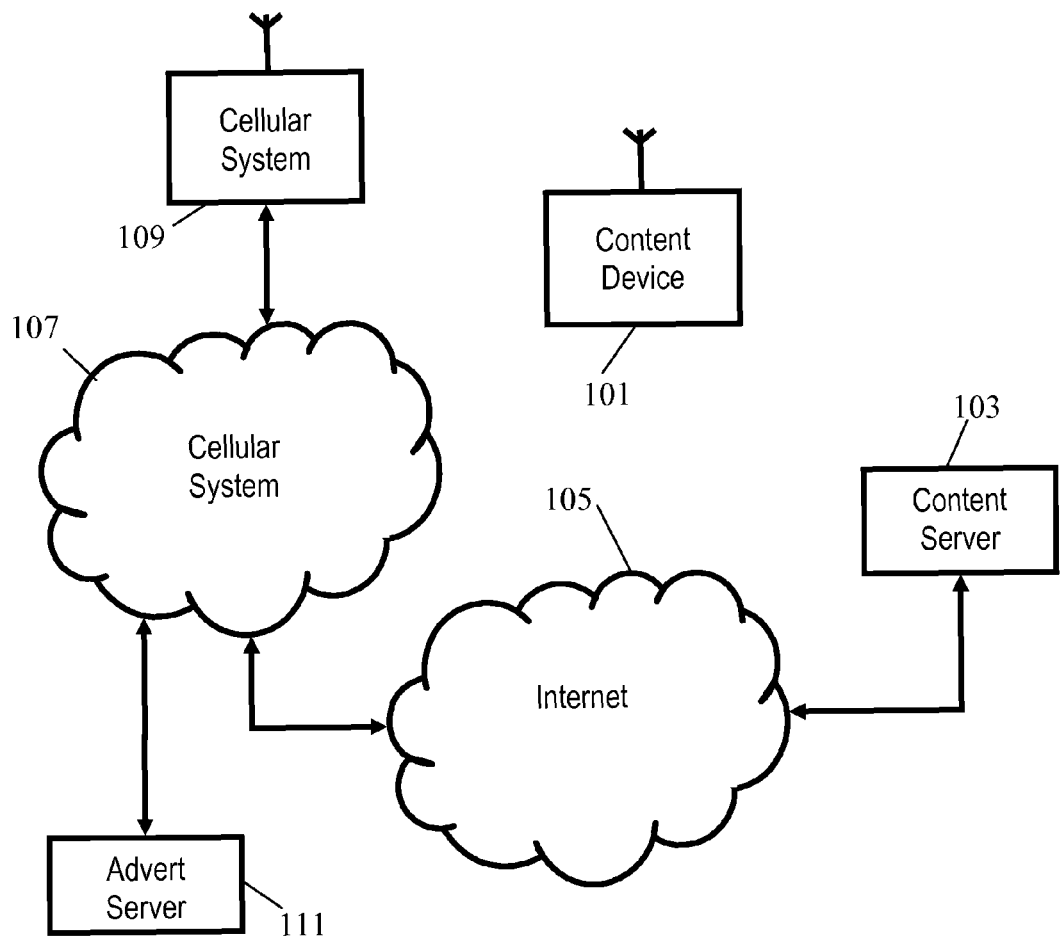
FIG. 1 is an illustration of an example of elements of a communication system in accordance with some embodiments of the invention.

FIG. 1 illustrates a communication system used to distribute content to a content device 101 which is capable of consuming content. In the specific example, the content device 101 is a mobile cellular device capable of presenting content to a user including presenting video clips, music clips, text documents and web pages to a user.

In the example, the content is provided by a content server 103 coupled to a communication network which in the specific example is the Internet 105. The Internet 105 is coupled to a cellular system 107 which supports the content device 101 via a base station 109. The cellular communication system 107 may for example be a Global System for Mobile communication or a Universal Mobile Telecommunication System.

In the system, the content device 101 can access the content server 103 to retrieve content items. The content items may for example be music clips, video clips, text documents, web pages, emails, Short Message Service messages etc. In the system, the content items have associated characterizing data that characterize the content items using text data. For example, the content items may have associated meta-data comprising various keywords that characterize the content. In some examples, the content items may themselves comprise text data which may be used directly as characterizing data. For example, the text of a web page may be extracted and used as characterizing data.

It will be appreciated that although FIG. 1 for brevity and clarity illustrates only a single content server 103, the system may include a large number of content servers from which the content device 101 can be provided with content items. For example, during web page surfing the individual web pages may be provided from different servers.

In the example, the content device 101 may also receive content items from an advert server 111. In the example, the advert server 111 is coupled to the cellular communication system 107 and is operated by the cellular network operator which is independent of any operator of the content server 103. The content items provided by the advert server 111 are not intended to be individually selected by the user of the content device 101 but are rather intended to be automatically associated with user selected content items from the content server 103. The adverts are thus intended to be automatically presented by the content device 101 without any specific user selection. The associated content items are in the examples selected by the content device 101 so that they match the content items selected by the user and specifically so that they match the content item that is currently being presented by the content device 101.

In the specific example, the associated content items are adverts that but will be appreciated that in other embodiments the associated content items may be other types of content items, such as for example content items providing additional background information related to the content item being presented (for example a discography may be presented for an artist of song currently being presented).

In the example, the adverts are associated with text based characterizing data. The characterizing data may for example be text based metadata characterizing the content item. The metadata may be generated by the advert server 111 by a keyword extraction process being applied to text based content, such as hyperlinked pages in the advertisement itself. This may provide additional information that can be used by the content device 101 when matching adverts and user selected content. Online adverts often hyperlink to a web page that enables the user to obtain more information or make a purchase, and this web page will accordingly typically comprise text useful for characterizing the advert.

Thus, in the system of FIG. 1, adverts provided by a cellular network operator can automatically be selected by the content device 101 to match user selected content being provided from content sources that are completely independent of the cellular network operator and the cellular system itself.

The system furthermore improves the matching of user selected content items and adverts by using supplementary domain-specific data that can easily be transmitted to and stored on individual resource constrained content devices. This data is provided in the form of one or more semantic graphs that have nodes which are terms (such as keywords) and edges (links between nodes) that have values representing the strength of association between the nodes linked by the edge.

In the system of FIG. 1, the content device 101 retrieves a selected content item from the content server 103 and furthermore receives text based characterizing data for the selected content item. In addition, the content device 101 receives adverts from the advert server 111 together with text based characterizing data that describes the adverts. The text based characterizing data comprises a set of terms that describes the content, such as for example a set of keywords. In addition, the advert server 111 provides a number of semantic graphs relating to different topics.

The content device 101 then proceeds to expand the terms set for the selected content item using a semantic graph. This results in an expanded term set which typically comprises additional terms that provide useful information relating to the selected content item. The content device 101 then uses the expanded term set to find one or more matching adverts which may be presented to the user together with the selected content item. For example, when the user selects a specific webpage one or more adverts which are provided by the cellular network operator may also be presented. These adverts are automatically selected to be particularly relevant to the webpage currently being browsed by the user.

Figure 2:
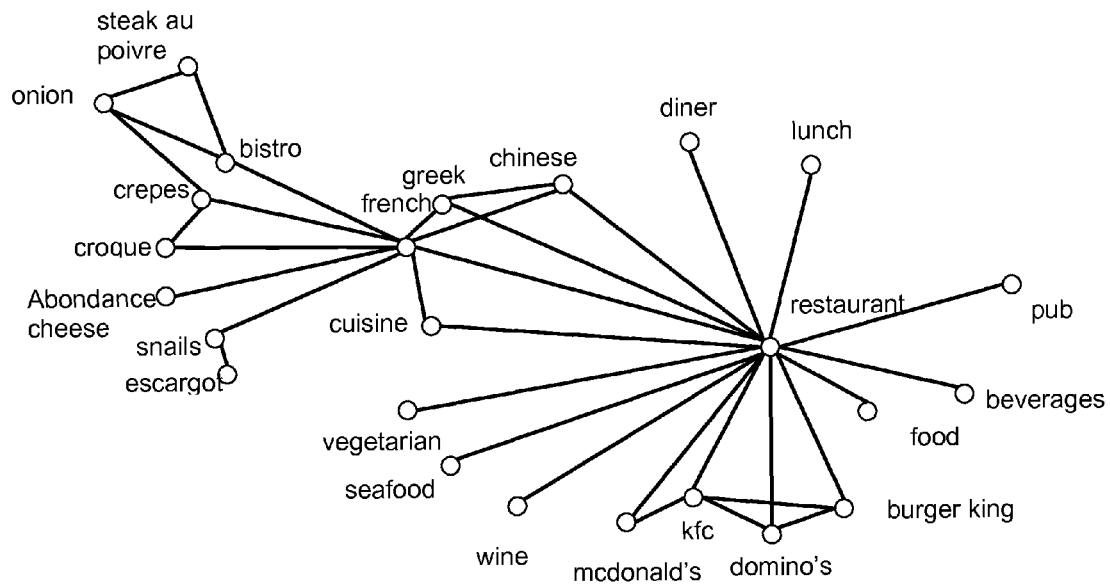
FIG. 2 is an illustration of examples of semantic graphs.
Figure 2:
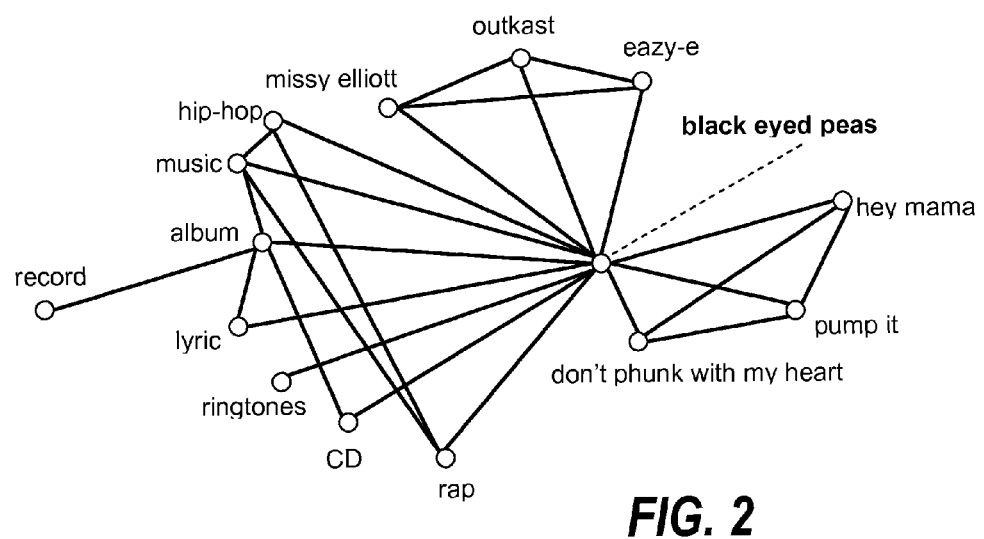

A semantic graph is a data structure that has the form of a connected network of nodes corresponding to terms (each term comprising one or more words). Two (simplified) examples of such graph are shown in FIG. 2 (with one corresponding to the topic of the music group "Black Eyed Peas" and the other corresponding to the topic of eating out). A semantic graph is provided by the advert server 111 for each of a number of topics. As will be described later, each semantic graph may e.g. be progressively built up by processing a suitable training set of text documents (either offline or online). The co-occurrences of terms within these corpora are exploited to build a connected network of terms. The graph nodes constitute a representation for the text terms and the graph edges express the relation (in the sense of co-occurrence) among terms in the graph.

In the specific example, the attributes stored for each node of a semantic graph are: the lemma of the term (a string value), the term frequency in the training documents (a numeric value reflecting ho often the term occurs in each document), the document frequency of the term in the training set (a numeric value reflecting the number of text documents of the training set in which the term is present), and the term type (e.g. whether the term is a noun, a named entity (i.e. person, location, organization, etc) or an adjective).

Each edge of the graph connects two nodes/terms and indicates that these terms co-occur in a suitable textual relationship in the training set (e.g. dependent on the type of the terms, whether they occur in the same sentence or in the same documents). The edge may have an edge value reflecting how closely linked or associated the terms are considered to be. For example, an edge value may be indicative of the number of co-occurrences of the terms (e.g. in a sentence or in a document).

As an example, for a given content item, the content device may specifically use the following steps to select a suitable advert:

Topic classification: The content item can be classified to relate to a specific topic and a semantic graph corresponding to this topic can be selected.

Graph-based expansion: A search term set which specifically can correspond to the terms of the characterizing data for the content item is expanded using the selected semantic graph. Specifically, additional terms can be selected from the semantic graph and added to the search term set to generate an expanded term set.

Similarity computation: A computation of similarity between the term sets for the adverts and the expanded term set is generated.

Advert selection: One or more adverts are selected depending on the similarity values. Specifically, the advert(s) having the highest similarity value may be selected.

Thus, semantic graphs are used to improve the accuracy of the matching between the user selected content item and adverts by performing expansion of the set of terms characterizing the user selected content item. This allows the expanded term set to provide a more accurate and diverse characterization of the selected content item. For example, if the original search term for the user selected content item comprises a term for a specific team sport and a specific player of that sport, the expansion may result in the addition of a term identifying the player's current team even if this is not included in the original term set.

Also, the semantic graphs provide compact representations of term configurations (i.e. terms and associations among them) for a specific topic or domain. Accordingly, the graphs may be communicated and processed with relatively low resource usage and thus the approach is highly advantageous for resource constrained devices and for resource constrained communication systems. Furthermore, the semantic graphs are highly suitable for being dynamically updated to reflect the individual user's specific preferences and characteristics. This update may for example be based on the user's content consumption and specifically on characteristics of the content selected by the user. Thus, in time, the semantic graphs may represent not only the semantic representation of a topic but also the user's particular preferences for that topic.

A substantial benefit of the approach is that the semantic graphs are sufficiently compact to be transmitted across constrained resource networks, such as cellular communication systems, while containing sufficient information to significantly improve the relevance of automatically selected adverts.

Figure 3:
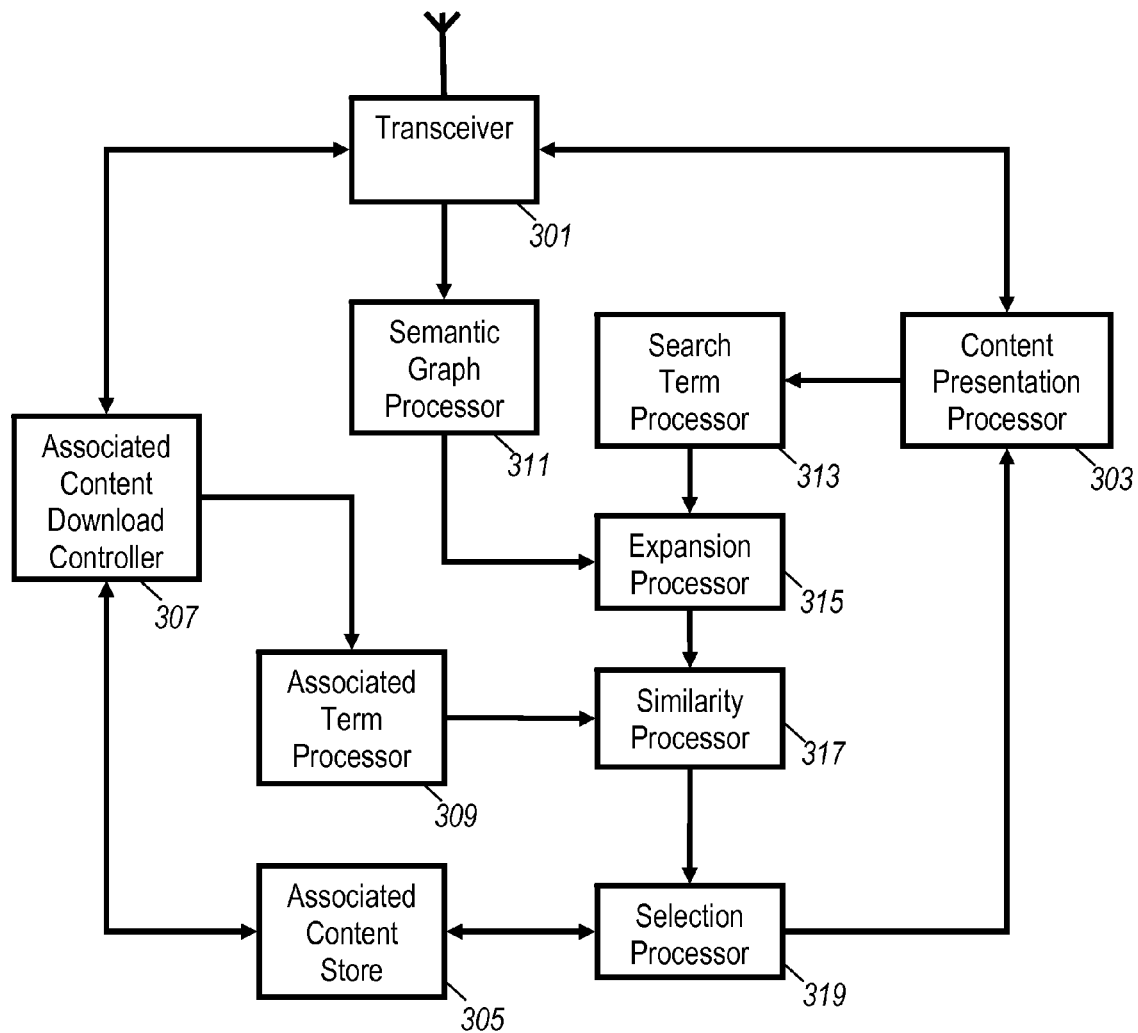
FIG. 3 is an illustration of a content device in accordance with some embodiments of the invention.
Figure 4:
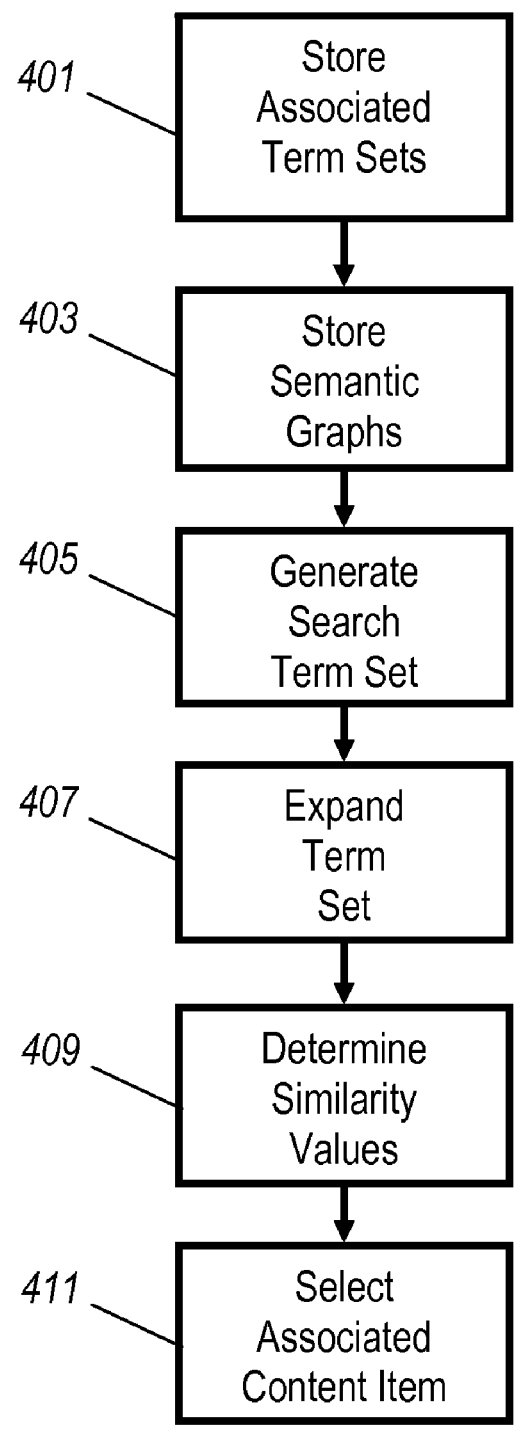
FIG. 4 is an illustration of an example of a method of selecting associated content in accordance with some embodiments of the invention.

FIG. 3 illustrates an example of the elements of the content device 101 and FIG. 4 illustrates an example of a method of selecting an associated content item (such as an advert). The method may be performed by the content device 101 and will be described with reference to FIG. 3.

The content device 101 comprises a transceiver 301 which is capable of communicating with the base station 107 over the air interface of the cellular communication system 107. The transceiver 301 is specifically capable of communicating with the content server 103 and the advert server 111. The transceiver 301 is coupled to a content presentation processor 303 which is capable of retrieving a content item, such as a webpage, from the content server 103. The content presentation processor 303 is furthermore capable of presenting the received content item to a user via a suitable user interface (not shown).

The content device 101 furthermore comprises an associated content store 305 which can store a set of adverts downloaded from the advert server 111. The content device 101 also comprises an associated content download controller 307 coupled to the transceiver 301 and the associated content store 305 and arranged to access the advert server 111 to download the set of adverts.

In addition, the associated content download controller 307 downloads characterizing data in the form of a term set for each downloaded advert. Each of the advert term sets comprises a set of one or more terms characterizing an advert. In some embodiments, the associated content download controller 307 may also download term sets for adverts that have not been downloaded to the content device 101 thereby allowing the content device 101 to select adverts available from the advert server 111 but not yet downloaded to the content device 101 itself. If such an advert is selected, the content device 101 may proceed to retrieve it from the advert server 111.

The associated content download controller 307 is coupled to an associated term processor 309 wherein the term sets for the adverts are stored. Thus, the associated content download controller 307 and the associated term processor 309 perform step 401 wherein advert term sets are stored at the content device.

The content device 101 furthermore comprises a semantic graph processor 311 coupled to the transceiver 301 and capable of receiving a set of semantic graphs from a remote server, which in the specific example is the same server that provides the adverts, namely the advert server 111. Each of the received semantic graphs comprises nodes that correspond to terms and edges that correspond to a relationship between terms of nodes connected by the edge.

Thus, the transceiver 301 and the semantic graph processor 311 perform step 403 of storing the set of semantic graphs. It will be appreciated that the set of semantic graphs typically contains a plurality of semantic graphs but that it may in some embodiments include only a single semantic graph.

The content device 101 furthermore comprises a search term processor 313 which is coupled to the content presentation processor 303. When a new content item is selected, retrieved, received, and/or presented by the content presentation processor 303, the search term processor 313 may receive a command from the content presentation processor 303 indicating that one or more suitable adverts should be selected for the content item. In this case, the search term processor 309 proceeds to execute step 405 wherein a search term set for the content item is generated. The search term set comprises terms characterizing the content item and may specifically be generated by simply extracting all keywords from metadata characterizing the content item. In other examples where the content item is a text document (such as e.g. a webpage), the search term processor 313 may extract keywords from the actual text, for example by Natural Language Processing which will be known to the person skilled in the art.

The search term processor 313 is coupled to an expansion processor 315 which is further coupled to the semantic graph processor 311. The expansion processor 315 receives the search term set from the search term processor 313 and the set of semantic graphs from the semantic graph processor 311. The expansion processor 317 then proceeds to execute step 407 wherein an expanded set of terms is generated by expanding the search term based on at least one semantic graph.

It will be appreciated that if the set of semantic graphs includes more than one graph, one (or potentially more) of the available semantic graphs may be selected. For example, a topic for the current content item may be determined and the corresponding semantic graph may be selected.

Thus, the metadata characterizing the content item is expanded with relevant terms from the user's set of semantic graphs. Specifically, new terms may be added that represent highly relevant terms given the topic of the current content. Furthermore, if the semantic graph has been customized to the specific user, the expansion may also specifically add terms which are relevant in view of the user's specific personal interests and preferences.

The expansion processor 315 is coupled to a similarity processor 317 which is fed the expanded term set. The similarity processor 317 is furthermore coupled to the associated term processor 309 which provides the stored term sets for the available adverts. The similarity processor 317 then proceeds to execute step 409 wherein similarity measures between the expanded set of terms and each of the advert term sets is determined. Thus, the similarity processor 317 generates similarity values that indicate how well the expanded terms set matches each of the term sets for the stored adverts.

The similarity processor 317 is coupled to a selection processor 319 which proceeds to execute step 411 wherein an advert of the stored adverts is selected in response to the similarity measures. As a simple example, the selection processor 319 may simply select the advert that has the highest similarity value.

In some embodiments, the selection processor 319 may also be arranged to select the advert(s) in response to a user preference profile.

It will be appreciated that the selected advert may be processed differently in different embodiments. In the specific example, the selection processor 319 is coupled to the associated content store 305 and to the content presentation processor 303 and is arranged to extract the selected advert(s) from the associated content store 305 and to provide the advert(s) to the content presentation processor 303 which then proceeds to present it to the user together with the selected content item.

Thus, as previously described, a highly advantageous approach for selecting suitable associated content items to a user selected content item is provided. The approach is particularly well suited to resource constrained devices and communication systems and provides an improved accuracy of the advert selection.

In the following, various aspects, considerations and features will be described in more detail.

Figure 5:
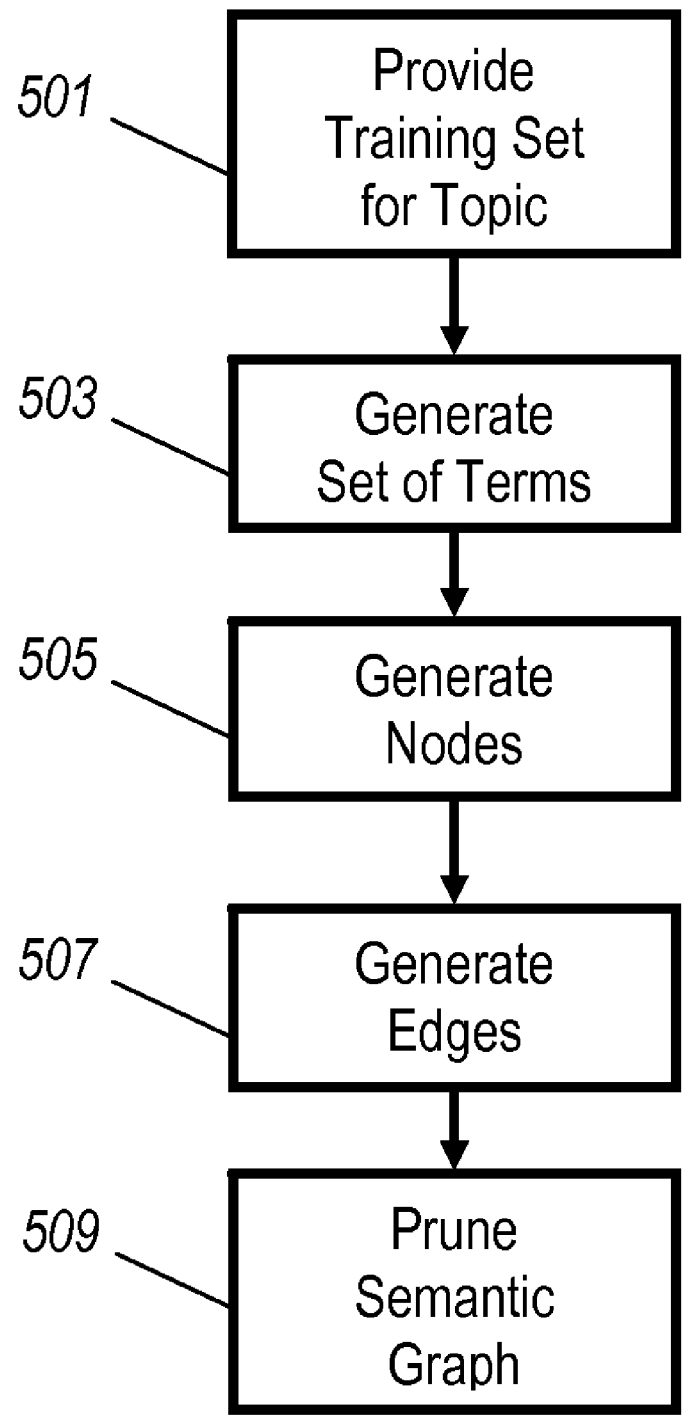
FIG. 5 is an illustration of an example of a method of generating a semantic graph in accordance with some embodiments of the invention.

In the specific system, initial semantic graphs for a plurality of topics are generated by the advert server 111 and communicated to the content device 101. The method used by the advert server 111 to generate a semantic graph is illustrated in FIG. 5.

The method initiates in step 501 wherein a set of training content items is provided. The training content items may specifically be a set of text documents that are known to be associated with the specific topic for which the semantic graph is generated. The set of training content items may for example be manually collected text documents (such as web pages). As another example, the set of training content items may for example be generated as web pages that are found using a specific search criteria and relevant for the specific topic.

Step 501 is followed by step 503 wherein a set of terms is generated. Specifically, the advert server 111 may extract relevant words from the text documents. As a specific example, a training set comprising web documents may be processed using parsing and Natural Language Processing as will be known to the skilled person. The result can be a set of text segments (a web document may consist of more than one text segment depending on its structure), where each text segment consists of a set of sentences and associated information indicating e.g. the type of the words (noun, adverb, named entity etc). The advert server 111 may then extract the terms (and specifically the words) in these text segments. Thus, in step 503, a set of terms is generated which comprises terms that are extracted from the training content items.

It will be appreciated that in some embodiments, the training content items are not necessarily text documents. For example, the training content items may be video clips that have associated text based metadata and the set of terms generated in step 503 may correspond to terms extracted from the metadata.

Step 503 is followed by step 505 wherein the advert server 111 proceeds to generate nodes for the semantic graph. Each of the nodes will correspond to a term of the set of terms generated in step 503. In the example, a node is generated in step 505 for each term in the set of terms. This may result in a large semantic graph which in the example will be pruned later. However, it will be appreciated that in some embodiments, nodes may only be generated from a subset of the terms in step 505, for example by integrating the node generation and the later described pruning in the same step (i.e. step 505 may also comprise the step 509 of pruning the semantic graph as will be described later).

In the specific example, the advert server 111 generates a node for each noun, named entity, and adjective accompanying a noun. Furthermore, a node value is generated which includes: the lemma of the term (a string value), the term frequency in the training documents (a numeric value), the document frequency of the term in the training set (a numeric value), and the term type (e.g. whether the term is a noun, a named entity or an adjective). For a term for which a node has already been created, the node value is updated (specifically the term frequency and document frequency may be modified).

Step 505 is followed by step 507 wherein edges are generated for the semantic graph. The edges are generated based on co-occurrences of the terms in the training set. Furthermore, for each generated edge connecting two nodes, an edge value is calculated. The edge value is indicative of the strength of the association between the two terms corresponding to the two nodes. Specifically, the edge value is calculated to be indicative of a co-occurrence frequency for the terms of the two nodes.

In particular, an edge is created:
For all co-occurrences in a sentence between two nouns or between a noun and a named entity.
For all co-occurrences between a noun and an adjacent adjective.
For all co-occurrences between two named entities in a training document.

Furthermore, the edge value is determined as a composite value that stores the number of each of these co-occurrences.

Although the resulting graph may in some embodiments be used directly, the exemplary method of FIG. 5 further includes step 509 wherein the graph is further pruned. This may in many scenarios result in improved advert selection. Indeed, for large semantic graphs, more imprecise results may result as a large graph with many terms and connections will typically represent a substantial degree of "linguistic" noise. Furthermore, the communication resource requirement, as well as the memory and processing resource requirements for the content device 101, may be substantially reduced by reducing the size of the semantic graphs.

Thus, in the example, step 507 is followed by step 509 wherein a number of the nodes generated in step 505 are removed from the graph together with the associated edges.

Specifically, the advert server 101 may remove a node if the determined term frequency value for the term of the node is below a given threshold or if the document frequency value for the term of the node is below a given threshold.

Specifically, lower thresholds for both term frequency values and document frequency values may be determined based on the statistics for these values in the graph (e.g. all nodes having a term frequency value below the average term frequency value may be removed and all nodes having a document frequency value below the 50% of the average document frequency may be removed).

Additionally or alternatively, the adverts processor 111 may remove a node corresponding to a term which is present in more than a given number of semantic graphs.

This approach may allow a cross-topic pruning by identifying terms that are present in multiple semantic graphs. Such terms will tend to be general terms that have less specific topic relevance and therefore is less likely to assist in selecting between adverts. An exception to this may be for terms that are prevalent in one topic (e.g. high term frequency) but are insignificant in other topics (e.g. a low term frequency) and the pruning may be amended to take this into account.

Additionally or alternatively, the adverts processor 111 may remove a node corresponding to a first term from the first semantic graph in response to a detection that the first term belongs to an excluded subset of terms.

Specifically, a set of excluded named entities (e.g. "Unit") may be predefined and the advert server 111 may remove any node and associated edges for terms that belong to this set of excluded named entities.

Alternatively or additionally, the advert server 111 may prune the semantic graph by removing one or more edges. Specifically, an edge may be removed if a co-occurrence value for the terms of the nodes which are connected by the edge is below a threshold.

For example, a lower threshold for the co-occurrence between two terms can be derived based on co-occurrence statistics from the graph. If the co-occurrence frequency between two terms is below that threshold (e.g. the average co-occurrence value), the edge between the terms is not included in the pruned graph. This pruning criterion is very effective in reducing the graph size, because there tends to often be may single co-occurrences that are often circumstantial and do not indicate a strong relation between the terms.

Figure 6:
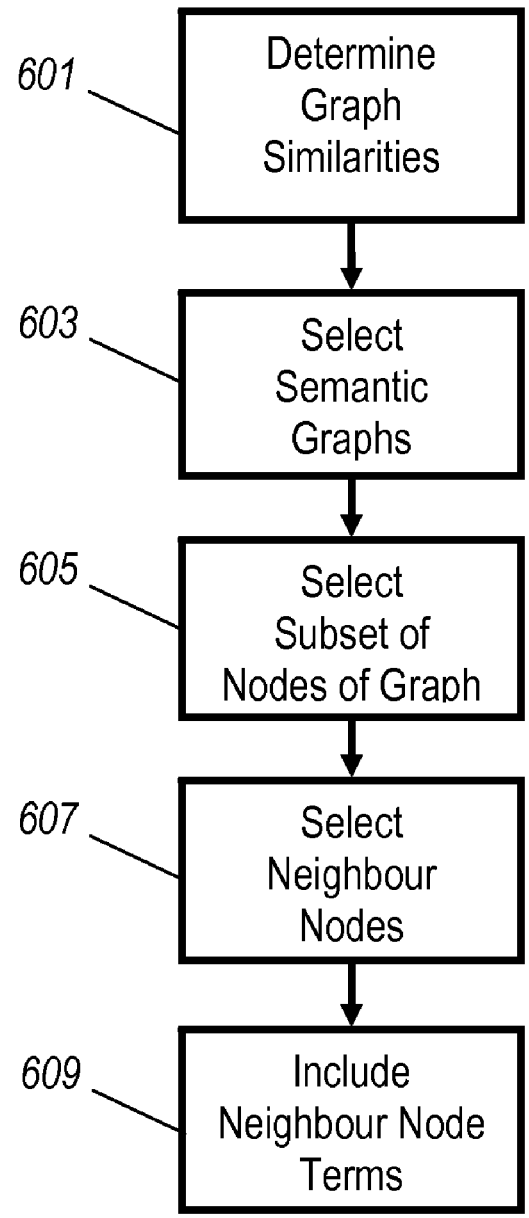
FIG. 6 is an illustration of an example of a method of expanding a term set in accordance with some embodiments of the invention.

FIG. 6 illustrates a specific example of how step 407 of FIG. 4 may be performed, i.e. of how the term set expansion may be performed. In the example, the content device 101 stores a plurality of semantic graphs each of which relates to a specific topic. Accordingly, when executing step 407 the content device 101 initially selects the semantic graph to be used for the term set expansion.

Specifically, the content device 101 may first determine a topic for the search term set, i.e. for the term set characterizing the user selected content item. For example, the terms of the search term set may be compared to keywords for known topics and the topic for which most matching keywords are found may be selected. The content device 101 can then proceed to select the semantic graph that is stored for this topic.

In the example of FIG. 6, a semantic graph is selected as the one that most closely correlates with the search term set. Specifically, the content device may execute substep 601 wherein a term similarity between each semantic graph and the search term set is determined. This term similarity reflects the correlation between the terms of the semantic graph and terms of the search term set.

As a simple example, the similarity value may simply be determined as the number of terms of the search term set that are also present as a node in the semantic graph.

As a more accurate and complex example, a similarity value for a graph g and a search term c containing the terms $t_i\{i=1 \ldots N\}$ can be determined as:

$$\text{similarity}(c, g) = \frac{\text{count}(t \in g)}{\text{count}(t)} \cdot \frac{\sum_{i=1}^{N} tf(t_i) \cdot \deg(t_i)}{\max(tf) \cdot \max(\deg)}$$

where:
- count(t∈g) is the total number of terms (nodes) present in the semantic graph g;
- count(t) is the total number of terms in the set of semantic graphs;
- $tf(t_i)$ is the term frequency of the term $t_i$ for the semantic graph g;
- $\deg(t_i)$ is the degree (the number of edges for the corresponding node) of the term $t_i$ in the semantic graph g;
- max(tf) is the maximum term frequency that exists in the semantic graph g (this value is independent of the search terms set); and
- max(deg) is the maximum degree of any node in the semantic graph g (this value is independent of the search terms set).

Substep 601 is followed by substep 603 wherein the content device 101 proceeds to select the semantic graph to use for the expansion. The semantic graph may simply be selected as the one having the highest calculated similarity value.

It will be appreciated that for topic specific semantic graphs, this approach is equivalent to determining a topic for the search term set and selecting the semantic graph associated with this topic.

The content device 111 then proceed to expand the search term set to generate the expanded term set by including terms of some neighboring nodes of nodes corresponding to terms of the search term set.

Specifically, substep 603 is followed by substep 605 wherein a subset of nodes of the selected semantic graph which have terms corresponding to terms of the search term set are selected.

The nodes that are selected in step 605 may specifically be selected as the nodes that are considered to correspond to terms that are particularly relevant or important for this topic. This importance or relevance may for example be reflected in the node value and/or the values of edges.

For example, the content device may select the nodes for which the term frequency and the document frequency are above a given threshold. As another example, the content device may be arranged to select a fixed size subset of nodes. For example, the fifty nodes having the highest term frequency may be selected.

As another example, only nodes for which one edge has a value that is indicative a co-occurrence degree between the term of the node and another term of the semantic graph which is above a given threshold is selected.

Alternatively or additionally, the nodes may be selected in response to a co-occurrence degree which is indicative of how many terms the node term co-occurs with. For example, the node degree (corresponding to the number of edges connected to the node) may be determined and the content device 101 may proceed to only include the nodes for which this value is above a given threshold. A high number of edges tend to be indicative of the node term being highly significant for the given topic and accordingly this approach may allow the subset of nodes to be selected to correspond to terms which are important for the specific topic.

Substep 605 is followed by substep 607 wherein a set of neighboring nodes is selected for the subset of nodes determined in substep 605. A neighboring node may be considered to be a node which is connected to a node of the subset of nodes by an edge of the semantic graph.

It will be appreciated that in some embodiments, the set of neighboring nodes may include all nodes that neighbors a node of the subset of nodes determined in substep 605. However, this may result in many terms being included which may not be highly significant for the topic, and in the specific example the selection of nodes to include in the set of neighboring nodes is performed in response to at least one of a node value and an edge value for neighbor nodes.

Specifically, a node may only be included if at least one of a term frequency value, a document frequency value and a co-occurrence value for the node meets a criterion. The criterion may require that the value is above a threshold thereby resulting in nodes only being included if the terms have sufficient significance in the semantic graph.

Alternatively or additionally, a neighboring node may only be included if it is sufficiently closely related to a term of the original search term. The selection may specifically require that an edge of the neighboring node to the node of the subset determined in step 605 has a value that exceeds a threshold. Thus, neighboring nodes may e.g. only be included if the co-occurrence value between the terms is above a given value.

Substep 607 is followed by substep 609 wherein one or more terms of the neighboring nodes are added to the terms of the original search term set to generate the expanded term set. It will be appreciated that in some embodiments all terms corresponding to the neighboring nodes will be included in the expanded term set. However, in other embodiments only some of the neighbor terms will be included.

As a specific example, the content device 101 may first determine edge connections in the first semantic graph which are between two nodes that correspond to terms which are both present in the expanded term set. Thus, in step 609 the content device first determines how many edges there are for each node of the expanded term set which are connected to another node of the expanded term set (i.e. for the group of nodes which contain the subset of nodes determined in step 605 and the neighboring nodes determined in step 607)).

Specifically, the expanded term set may be sorted based on how often the terms of the expanded term set co-occur with each other.

The content device 101 may then proceed to select the terms of the neighboring nodes that are included in the final expanded set of terms depending on these edge connections. For example, only a fixed number of expansion terms may be included and these may be selected from the terms of the neighboring nodes as the ones having the highest number of co-occurrences with other terms of the search term set and terms of the other neighboring nodes. Such an approach may result in a more consistent expansion and a selection of terms which are particularly significant for the specific content item.

The similarity measures that are calculated in step 409 are specifically calculated to reflect a correlation degree between terms of the expanded term set and terms of the term set characterizing the individual advert.

The calculation may for example be based on cosine similarities, such as:

$$\cos(terms_C, terms_{Ad}) = \frac{terms_C \cdot terms_{Ad}}{|terms_C| \cdot |terms_{Ad}|}$$

$$\cos(terms_{Exp}, terms_{Ad}) = \frac{terms_{Exp} \cdot terms_{Ad}}{|terms_{Exp}| \cdot |terms_{Ad}|}$$

where $terms_c$ and $terms_{Exp}$ respectively denote the set of expansion terms and the search term set and $terms_{Ad}$ denote the term set characterizing the individual advert. The term sets are represented as vectors containing the individual terms as components. The multiplication operator indicates an operation corresponding to $\Sigma t_i$ where $t_i$ has a value of one if the terms are identical and zero if not, and |terms| indicate the number of terms in the term set.

The similarity value for a content C and an advert Ad may then be calculated as:

$$sim(C,Ad)=Min(\cos(terms_C, terms_{Ad})+\cos(terms_{Exp}, terms_{Ad}), 1.0)$$

The content device 101 may then select the advert for which the highest similarity value is calculated.

In some embodiments, the content device may be arranged to modify one or more of the semantic graphs in response to characteristics of the content items that are selected by the user. For example, when a user selects a specific content item, the characterizing data for this content item (e.g. the associated metadata or text extracted from a text content item) may be correlated with the terms of a semantic graph and used to update the graph. The modification may for example add or remove nodes to the semantic graph and/or may for example modify a node value or an edge value of the graph.

Thus, in the system, generic semantic graphs for a plurality of topics are initially downloaded from the advert server 111 at the initialization of the service. Thus, initially a default set of semantic graphs constructed by the advert server 111 is communicated to new content devices subscribing to the service. However, based on e.g. metadata extracted from the consumed content, the content device can update the graph structure so that, with time, each content device 101 will have an individual set of graphs that better reflect the user's personal interests and preferences.

In the system, the semantic graphs stored in the content device 101 are updated each time new content is consumed by the user. The update process may specifically be similar to the process employed during the default graph construction by the advert server 111. Thus, the term frequency or document frequency may be increased whenever a term of the semantic graph is detected in a selected content item. Similarly, a co-occurrence between two terms may also be detected and used to increase an edge value for an edge connecting the two nodes corresponding to these two terms. Furthermore, at regular intervals new statistics may be calculated for the graph and used to prune the graph. E.g. the term frequencies may change with time and may result in a term frequency falling below a given threshold resulting in the corresponding node being removed. Also, if a new term is detected, this may be added to the semantic graph.

In order to increase the initial speed of adaptation, the modification value which is applied to a node value or an edge value may be decreasing with time such that it initially is substantially stronger. E.g. a temporarily decaying factor can be used when updating a term frequency, document frequency or co-occurrence value. Denoting the value being modified by d, the modification may for example be given as:

$$d_{new}=(1+\alpha \cdot e^{-(t-t0)}) \cdot d_{old}$$

where t is the time of content consumption and $t_0$ is a zero time-point (e.g. the time when the default semantic graph was received). $\alpha$ is a design constant that can be set to result in the desired update speed.

It will be appreciated that the modification and user adaptation of the semantic graphs may result in substantially improved term set expansion and thus advert selection. In particular, the personalization of the semantic graphs may provide a highly efficient and low complexity means for selecting adverts that match both the currently selected content item as well as the user's general preferences.

In some embodiments, the modified semantic graphs may also be used to select a subset of the total available adverts that are evaluated by the content device. In particular, in the example, the content device 101 may select the advert to be presented from the group of adverts that have been stored on the content device 101 itself. However, the group of content items may furthermore be selected in response to the updated semantic graphs. In particular, the adverts which are downloaded from the advert server 111 may be selected on the basis of one or more of the modified graphs. Thus, the modified graphs may be used to perform a first level filtering for the adverts that are available from the advert server 111.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A method of selecting a content item, the method comprising:
   providing a plurality of associated term sets, each associated term set of the plurality of associated term sets comprising a set of terms characterizing a user selected content item of a group of provided content items from a content source;
   providing a set of semantic graphs, each semantic graph of the set of semantic graphs comprising nodes corresponding to terms and edges corresponding to a relationship between terms of nodes connected by the edge;
   providing a search term set comprising terms characterizing a first content item;
   expanding the search term set in response to a first semantic graph of the set of semantic graphs to generate an expanded set of terms;
   determining similarity measures between the expanded set of terms and each of the plurality of associated term sets; and
   selecting an associated content item comprising an advert for the first content item from the group of provided content items in response to the similarity measures.

2. The method of claim 1 wherein expanding the search term set comprises:
   selecting a subset of nodes of the first semantic graph having terms corresponding to terms of the search term set;
   selecting a set of neighboring nodes for nodes of the subset of nodes; and
   including at least some terms of the neighboring nodes in the expanded set of terms.

3. The method of claim 2 wherein selecting the subset of nodes comprises further selecting the subset of nodes in response to a co-occurrence degree of terms of the search term set.

4. The method of claim 2 wherein selecting the subset of nodes comprises further selecting the subset of nodes in response to at least one of a node value and an edge value.

5. The method of claim 2 wherein selecting the set of neighboring nodes comprises selecting the set of neighboring nodes in response to at least one of a node value and an edge value for neighbor nodes.

6. The method of claim 2 further comprising determining edge connections in the first semantic graph between nodes belonging to a group comprising the subset of neighboring nodes and nodes corresponding to terms of the search term set; and
   selecting terms of the neighboring nodes to be included in the expanded set of terms in response to the edge connections.

7. The method of claim 1 further comprising:
   determining a term similarity between each semantic graph of the set of semantic graphs and the search term set, the term similarity for a semantic graph reflecting a correlation between terms of the semantic graph and terms of the search term set; and
   selecting the first semantic graph in response to the term similarities.

8. The method of claim 1 wherein each semantic graph of the set of semantic graphs is associated with a topic and the method further comprises:
   determining a search topic associated with the search term set; and
   selecting the first semantic graph in response to the search topic.

9. The method of claim 1 wherein the first content item is a text content item and the method further comprises generating the search term set to comprise text terms of the text content item.

10. A content device comprising:
   an associated term processor for providing a plurality of associated term sets, each associated term set of the plurality of associated term sets comprising a set of terms characterizing a user selected content item of a group of provided content items from a content source;
   a receiver for receiving a set of semantic graphs from a remote server, each semantic graph of the set of semantic graphs comprising nodes corresponding to terms and edges corresponding to a relationship between terms of nodes connected by the edge;
   a search term processor for providing a search term set comprising terms characterizing a first content item;
   an expansion processor for expanding the search term set in response to a first semantic graph of the set of semantic graphs to generate an expanded set of terms;
   a similarity processor for determining similarity measures between the expanded set of terms and each of the plurality of associated term sets; and
   a selection processor for selecting an associated content item comprising an advert for the first content item from the group of provided content items in response to the similarity measures.

* * * * *